Figure 1:
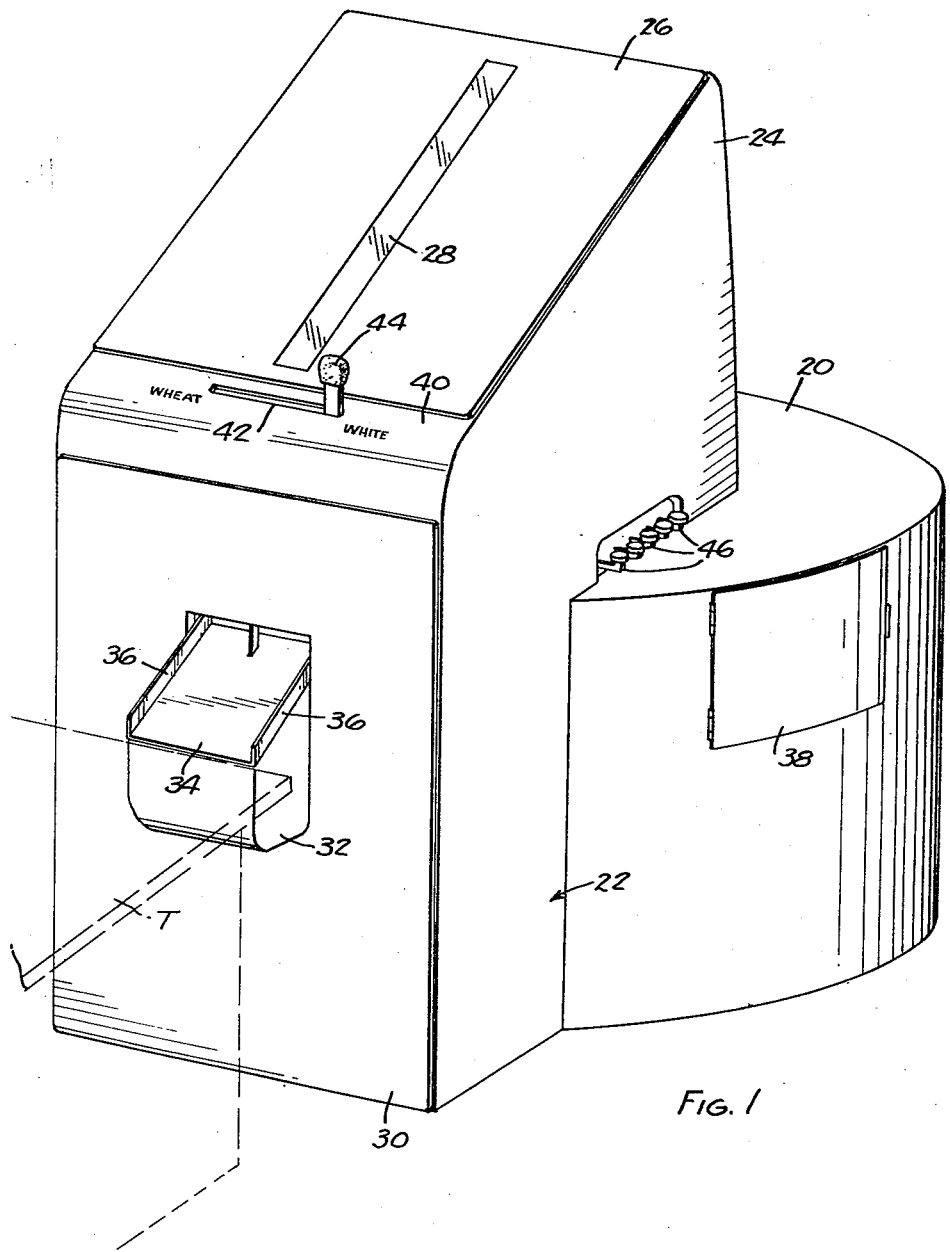

Oct. 22, 1957     E. L. C. STANFORD     2,810,359
APPARATUS FOR MAKING SANDWICHES
Filed Nov. 4, 1953     7 Sheets-Sheet 1

INVENTOR.
ERIC L. C. STANFORD
BY
*Barnes, Kisselle, Laughlin & Rauch*
ATTORNEYS.

Oct. 22, 1957     E. L. C. STANFORD     2,810,359
APPARATUS FOR MAKING SANDWICHES
Filed Nov. 4, 1953     7 Sheets-Sheet 2
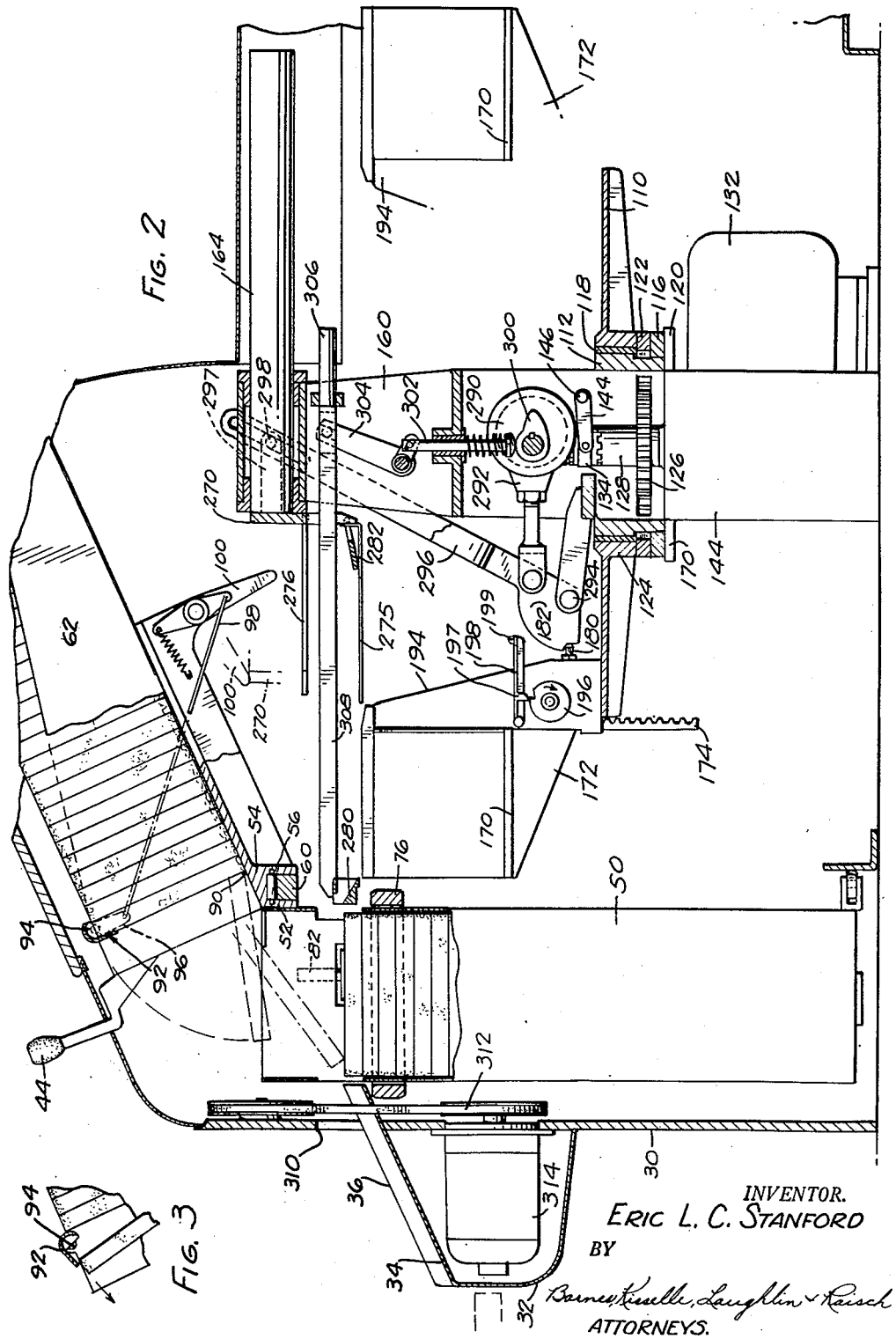
INVENTOR.
Eric L. C. Stanford
BY
ATTORNEYS.

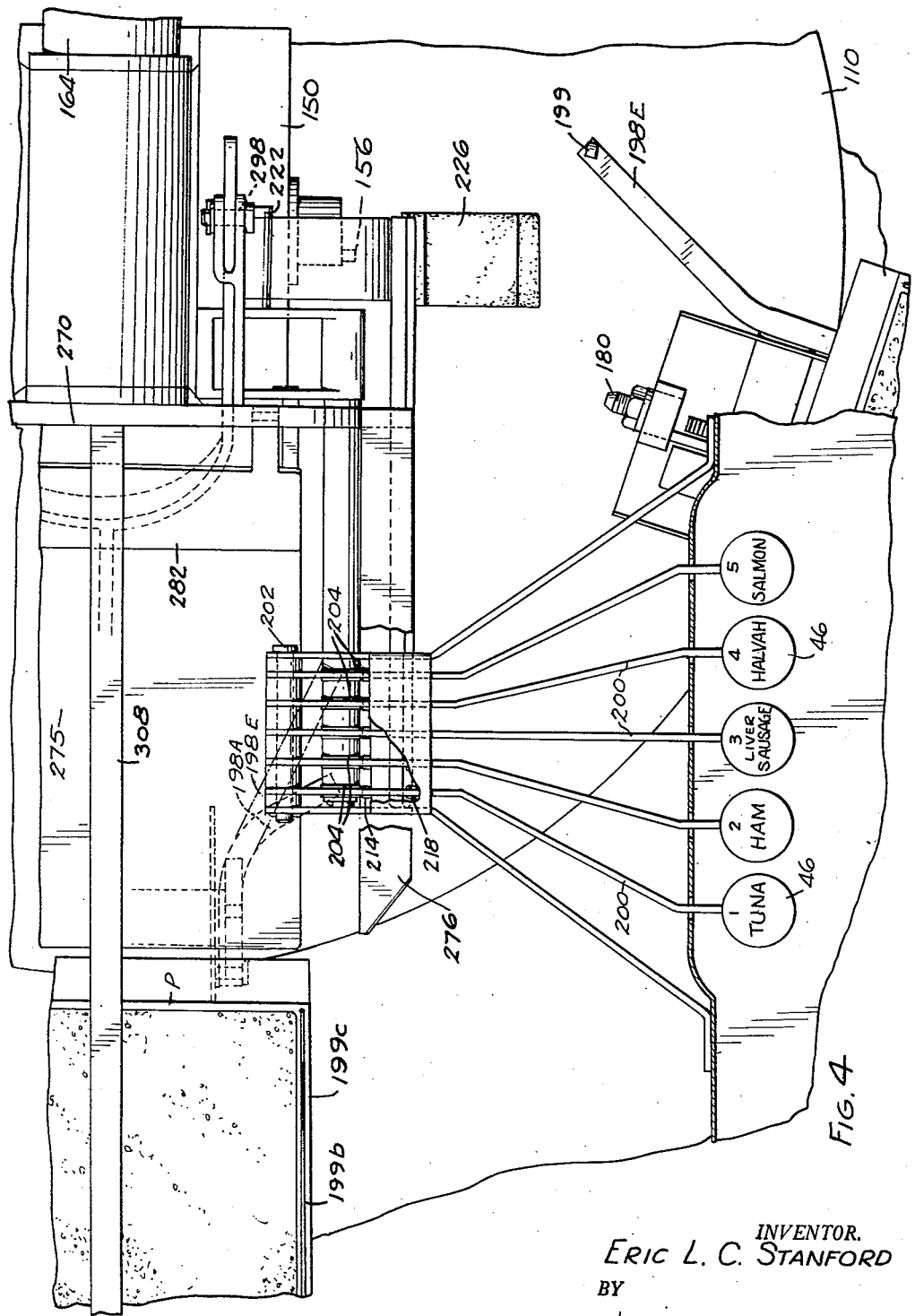

Oct. 22, 1957 E. L. C. STANFORD 2,810,359
APPARATUS FOR MAKING SANDWICHES
Filed Nov. 4, 1953 7 Sheets-Sheet 4
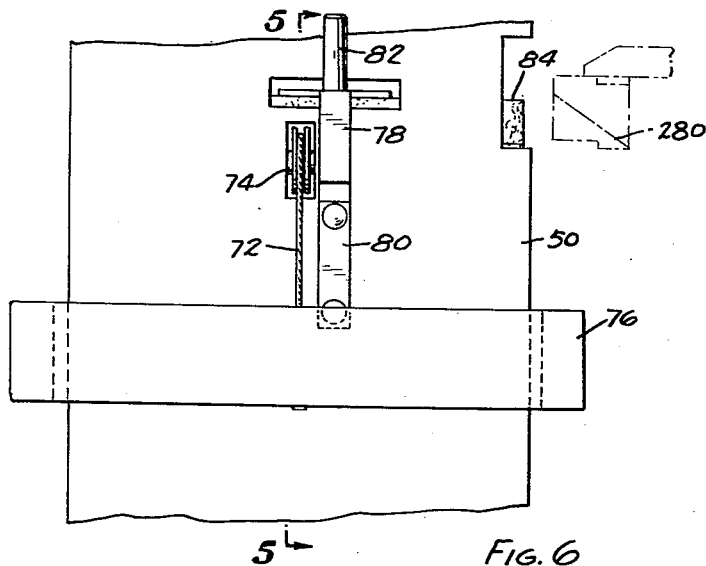
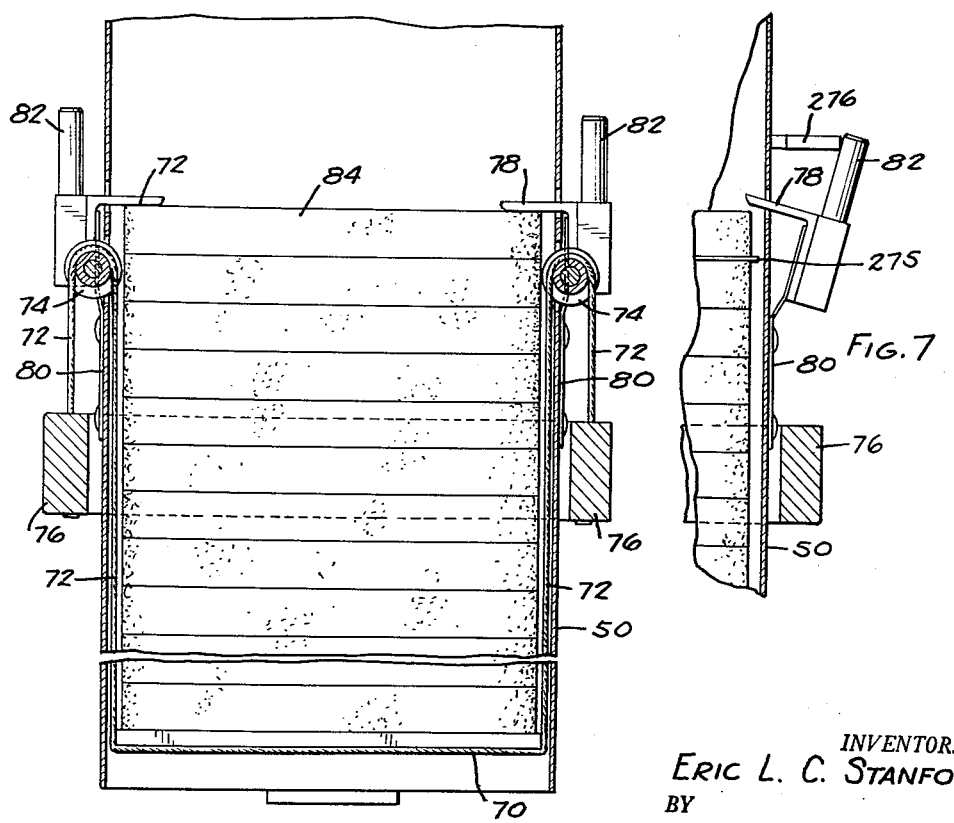
INVENTOR.
ERIC L. C. STANFORD
BY
Barnes, Kisselle, Laughlin & Raisch
ATTORNEYS.

Oct. 22, 1957  E. L. C. STANFORD  2,810,359
APPARATUS FOR MAKING SANDWICHES
Filed Nov. 4, 1953  7 Sheets-Sheet 5

INVENTOR.
ERIC L. C. STANFORD
BY
Barnes, Kisselle, Laughlin & Raisch
ATTORNEYS.

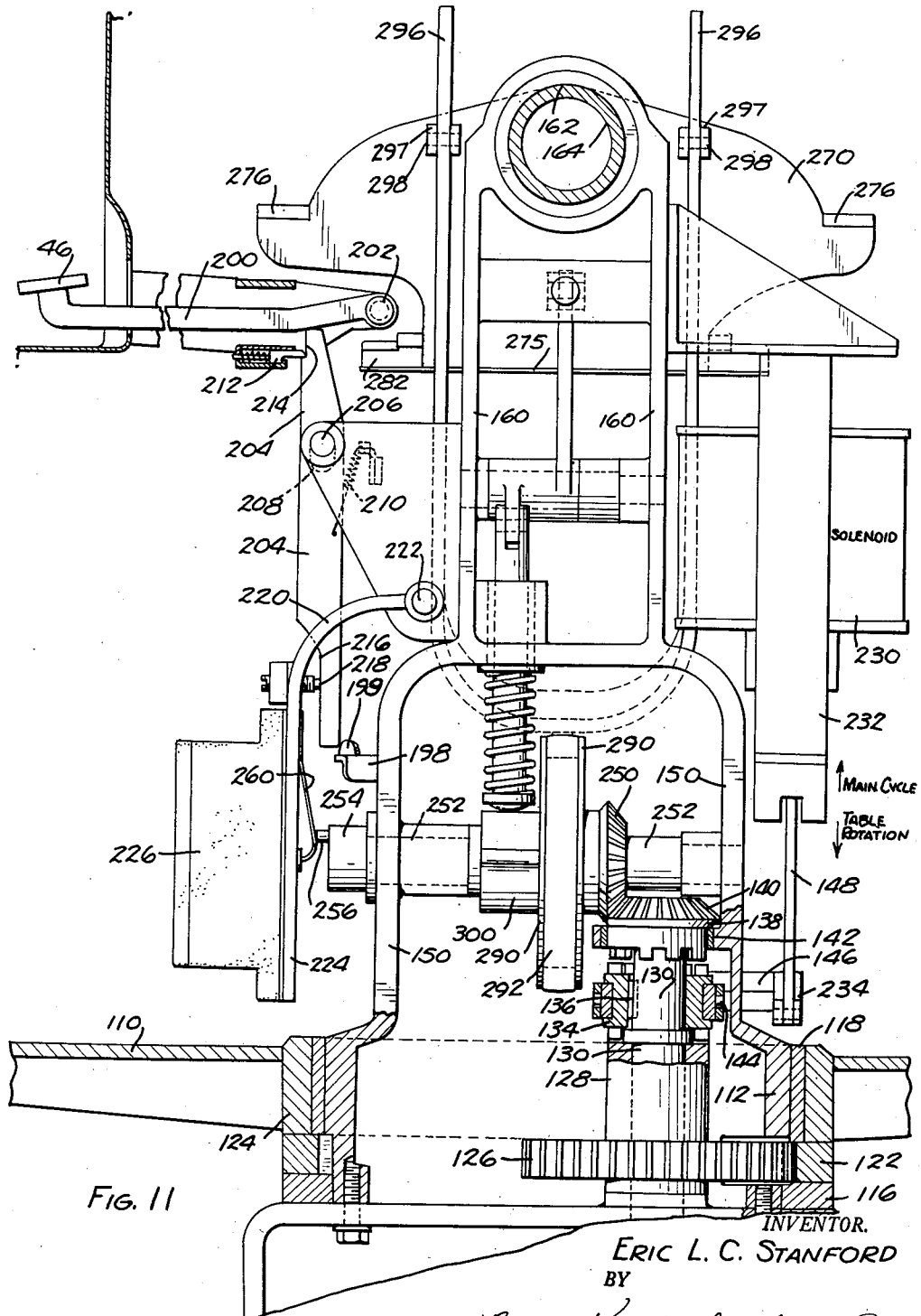

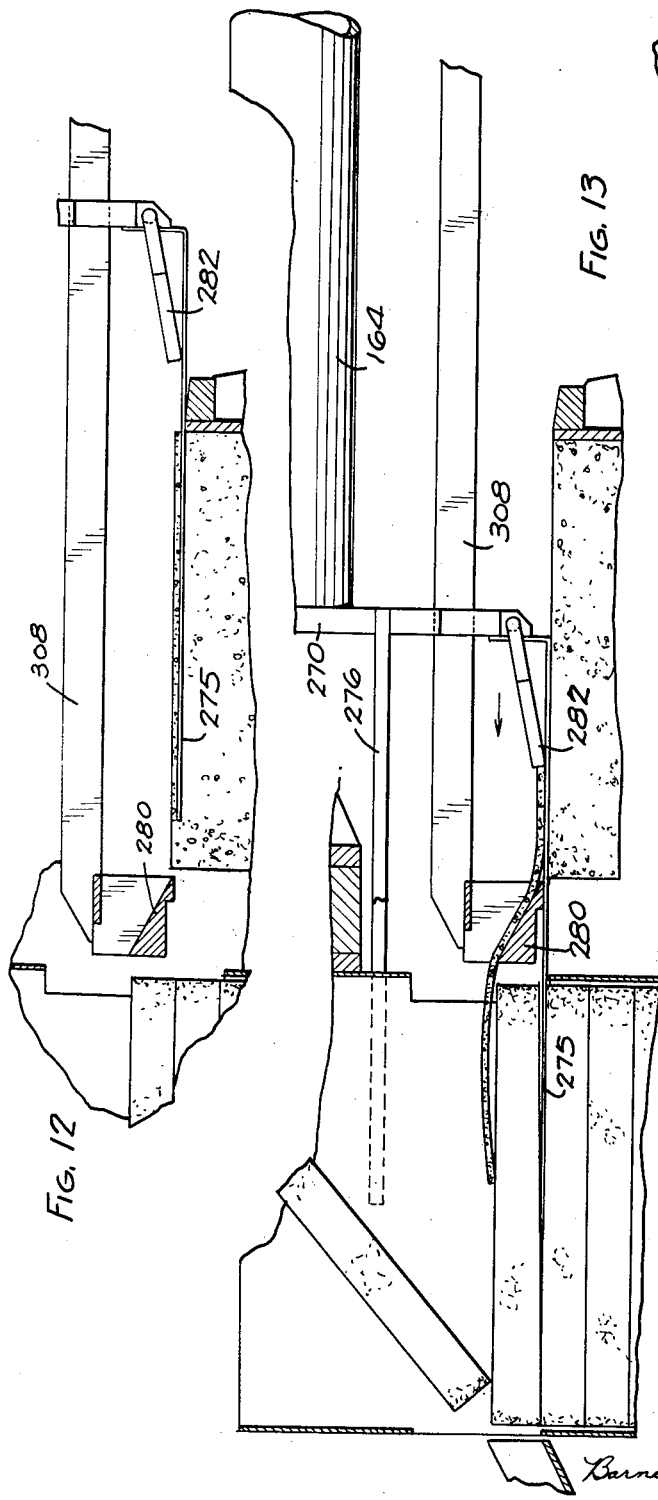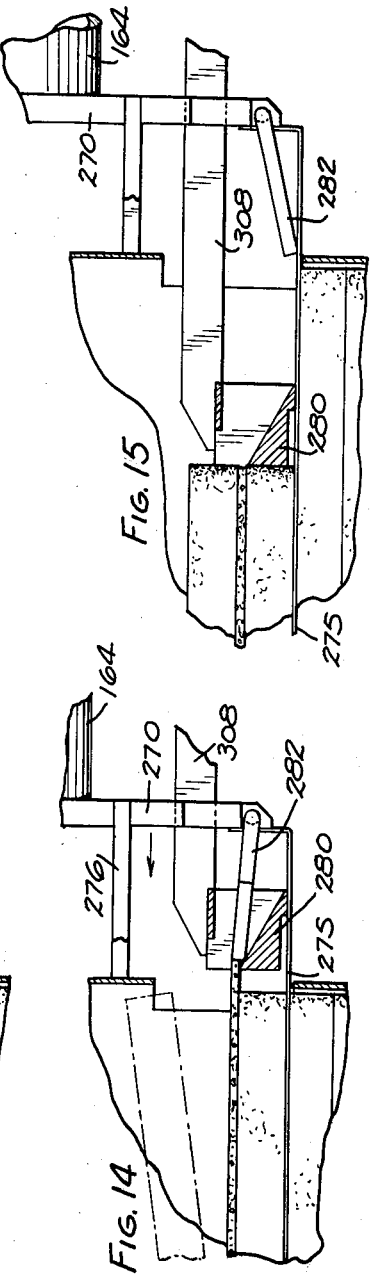

United States Patent Office 2,810,359
Patented Oct. 22, 1957

2,810,359

APPARATUS FOR MAKING SANDWICHES

Eric L. C. Stanford, Port Huron, Mich.; Marie Taft Stanford, executrix of said Eric L. C. Stanford, deceased Application November 4, 1953, Serial No. 390,183

14 Claims. (Cl. 107—1)

This invention relates to apparatus for making sandwiches in accordance with a particular series of steps.

It is an object of the present invention to provide a sandwich-making machine which will mechanically produce sandwiches consisting of two slices of bread, with or without butter, together with any of the various ingredients commonly used for sandwiches.

The apparatus to be described may be used especially in retail food establishments where sandwiches of varying ingredients can be produced by the machine in response to mechanical order on the part of the operator in a very short time and in a manner to provide uniform results and a sanitary product.

The device is usable not only in drug stores and lunch counters and other types of stores but also in cafeterias and canteens and various commercial establishments. The method and device are also adaptable to automatic coin-operated actuation where a machine may be operated by a purchaser after a coin or coins are deposited.

It is an object to provide a sandwich-making machine which keeps the ingredients fresh and free from contamination and a machine which is also adapted to handle different types of bread as well as several different ingredients for the sandwich.

Briefly, the invention consists in storing a supply of sliced bread, moving the slice of an ingredient material for the filling over one slice, and applying the other slice and then discharging the combined bread and ingredient at a suitable position for use. The apparatus comprises storage chambers selectively available for different types of bread, a moving ingredient holder, a selector mechanism for transferring the ingredient to a proper position for use, an ingredient transfer unit to move a predetermined quantity of the ingredient into sandwich position, and actuation mechanism for shifting and releasing the various ingredients, including the bread and the filling material at proper times for suitable operation.

Drawings accompany the description, and the various views thereof may be briefly described as:

Figure 1, a perspective view of the housing for the sandwich-making apparatus.

Figure 2, a sectional side view showing the bread storage housing and the ingredient table.

Figure 3, an enlarged detail of a bread release mechanism.

Figure 4, a partial plan view of the selector mechanism.

Figures 5, 6, and 7, sectional, elevation, and alternate position views of a bread feeding mechanism.

Figure 8:
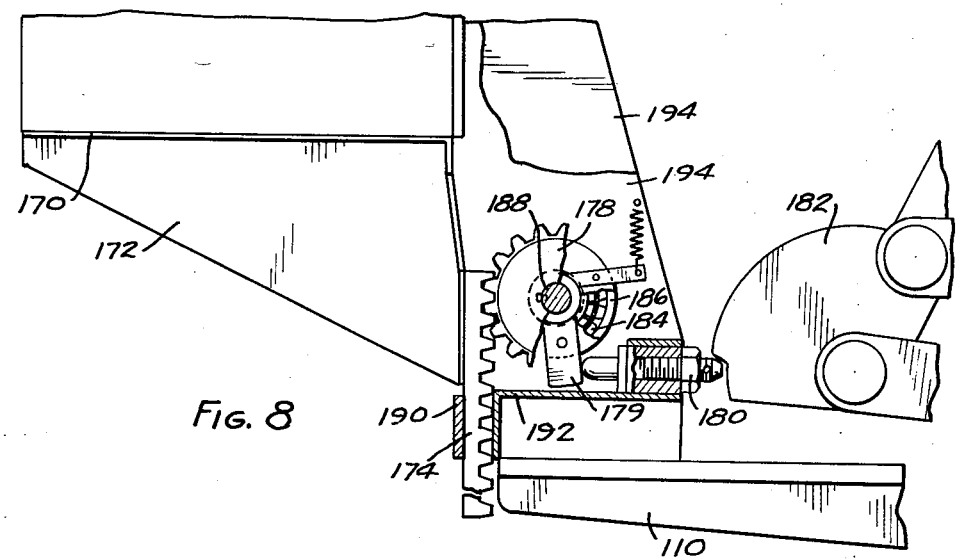

Figure 8, a sectional view showing a portion of the ingredient tray table and a feed mechanism.

Figure 9:
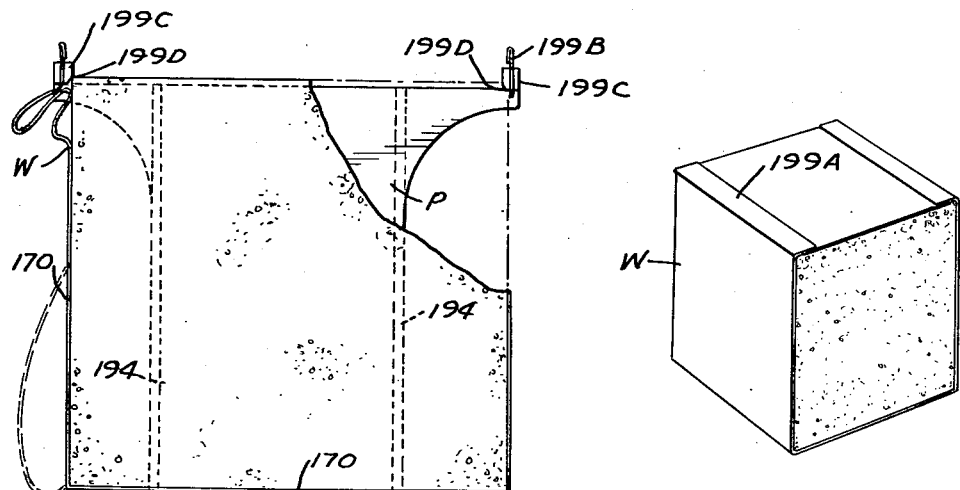

Figure 9, a side elevation of an ingredient tray and feed rack.

Figure 10:
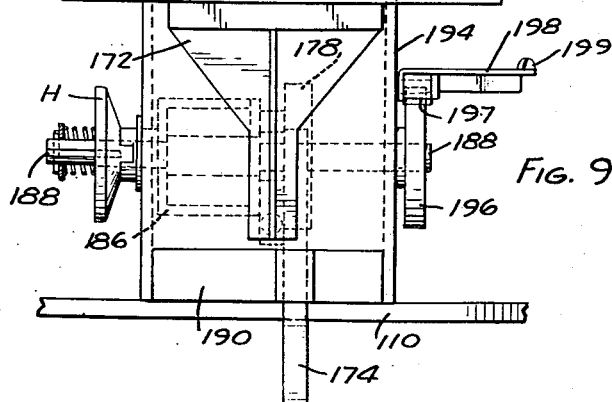

Figure 10, a perspective view of an ingredient holder.

Figure 11, a vertical section of the machine showing the driving mechanism, including the clutch, the cross head mechanism and the selector switch viewed from the rear of the machine.

Figure 12, a view of the ingredient feed mechanism as it approaches the sandwich-making position.

Figure 13, a view showing the manner in which a slice of sandwich filling material is fed onto the lower slice of the sandwich.

Figure 14, a view showing the sandwich nearing completion with the top slice falling into position.

Figure 15, a view of a portion of the completed sandwich and showing the manipulating parts in retraction.

Referring to the drawings, in Figure 1 the housing of the device as embodied in a counter machine consists of a partially cylindrical chamber 20, out of which projects radially a rectangular housing 22 which extends also vertically above the chamber 20 in a housing 24, which has an angled face surface 26 in which a transparent plate 28 extends longitudinally of the panel and centrally thereof. The front face 30 of the housing 22 has a small projection housing 32 which covers a sandwich-cutting motor to be later described.

On the top of the housing 32 is a slanted chute with a guiding edge 36, into which the sandwich is projected upon completion. In the wall of the housing 20 is a closure 38 for the entry of ingredients into the ingredient feed table. Between the face 30 and face 26 of housings 22 and 24 is a curved connecting panel 40 slotted at 42 for a shift lever 44 which controls the type of bread to be used in the sandwich. A table T is shown in dotted lines in front of the chute 34 to receive completed sandwiches. At the right side of housing 24, as viewed in Figure 1, selector keys 46 are positioned to be actuated by an operator. The device may also be placed in a floor cabinet.

In Figure 2 there is shown the bread storage mechanism and also the ingredient tray table as well as the ingredient feed mechanism, the transfer device for the sandwich filling and a part of the mechanism for operating the device.

Starting with the bread containers, these are disposed above and below the sandwich-making position or station. A vertical bread storage tube 50 is mounted at 52 on a slide bracket 54. This bracket is mounted to slide on rollers 56, which ride on horizontal transfer bars 60 extending across the housing. A roller 61 stabilizes the device at the bottom of tube 50. There are two such tubes 50, one behind the other, as viewed in Figure 2, one for carrying white bread and another for holding wheat or some other variety of bread. The panel 30 can be removed to permit filling of these bread tubes. More bread selection tubes may be added if desired.

Lying at an angle also fastened on the slide bracket 54 are bread tubes 62 for feeding the top slice of the sandwich. A shift handle 44 extends outwardly of the housing to permit shifting of the respective bread tubes, either to the right or to the left to be in proper position for the making of a sandwich. The bread is placed in the tubes 50 and 62 in sliced condition and means is provided to release a slice at the bottom and the top when a sandwich is being made.

In the tube 50 is an elevator plate 70 urged upwardly by flexible cables 72 extending over pulleys 74 to a square counterweight 76. This weight tends to put a compressive upward force on the elevator plate 70. The bread is prevented from rising by L-shaped retainers 78 mounted on spring leaves 80 riveted to the side of the bread container. Extending upwardly from the member 78 outside the bread container are pins 82 positioned to be actuated outwardly to move the retainer member 78 away from the bread to permit it to rise. The actuator for these pins 82 and the means to limit the upward movement of the bread column will be described later. In Figure 5 the bread is shown at 84 confined between plates 78. In Figure 7 the plates 78 are shown moved away, The bread in the top tubes 62 is stopped in its downward descent by a small projection 90 on the lower surface of the chute and at the top by an inverted J-shaped device 92. This device is mounted at each end on the sides of tube 62 at 94 as shown in Figure 3 so that it may pivot from the position shown in Figure 2 to the position shown in Figure 3. In this pivoting action the short side of the J cuts in between the foremost slice and the next slice, releasing the first slice and holding the second slice back until the member 92 returns to its original position. A retainer and release device 92 is provided for each upper bread chute.

The member 92 is actuated through an arm 96 shown in dotted lines in Figure 2, which is connected to a transfer wire 98 associated with a spring-returned actuation lever 100 to be actuated by a cross slide in a manner to be described.

In Figure 2 an ingredient turntable support 110 is shown rotatably mounted on a vertical journal 112 at the top of a gear housing 114. Suitable bearing material 116 and 118 is provided for the rotation of this table on the journal, which is supported on a flange 120 around the housing 114. A ring gear 122 is fastened to the hub 124 of the table 110 having internal teeth to co-operate with a drive gear 126 mounted on an extended hub 128 which is rotatably mounted on a drive shaft 130 projecting upwardly from the gear housing 114.

As shown in Figure 11, shaft 130 is driven by a motor 132 through suitable reduction gears (not shown) in housing 114. At the top of the hub 128 are axially projecting teeth which interengage with and co-operate with a tooth clutch 134 splined at 136 to the shaft 130. The clutch ring 134 is shiftable vertically and has teeth at the top which may engage axially extending teeth on a combination gear unit 138 having a bevel gear 140 and journaled at 142 around the shaft 130.

Power from shaft 130 will then be transmitted either to unit 128 or 138, depending on the position of the clutch ring 134. A yoke 144 controlled by a shaft 146 is positioned to actuate the clutch ring 134 in response to motion of a lever 148, the actuation of which will be later described.

Shaft 146 is mounted on one side of an open housing 150 which extends upwardly into an integral frame housing 160, on the top of which is a circular bearing or journal opening 162 in which is mounted a slide rod 164 (see Figures 2 and 11).

It will be seen that when the parts are positioned as shown in Figures 2 and 11 motion of the shaft 130 will be transmitted to hub 128 and gear 126, which in meshing with ring gear 122 fastened to the hub 124 will cause rotation of the ingredient table 110. On this ingredient table are ingredient platforms 170 for holding vertically disposed sandwich filling material, such as sliced cheese, sliced lunch meat of any kind, and possibly such materials as a tuna fish salad mix, meat loaf, and so on. The ingredient platforms 170 are supported on a bracket housing 172 extending to the table 110.

The ingredient platform 170 and housing 172 (see Figure 8) in turn are supported on a vertically slidable toothed rack 174. Mechanism is, therefore, required not only to turn the table as previously described but to index or feed the ingredient supporting plate 170 upwardly. The rack 174 is engaged with and actuated by a pinion ratchet 178 which in turn is moved in a step-by-step motion by a bell crank 179 and an adjustable plunger 180 actuated by cam 182, there being a one-way clutch connection 184 between an actuator housing 186 and the gear 178 mounted on shaft 188. Ratchet pinion 178 keyed to shaft 188 is off-center to accommodate the bell crank 179 located on center.

The rack bar 174 is mounted between a connection plate 190 on table 110 and a supporting plate 192 supporting also the slidable plunger 180. The shaft 188 is mounted between vertical bracket plates 194 mounted on table 110 and housing the clutch 184. Shaft 188 at one ends extends through one plate 194 and bears at the outer end a wheel 196 intended to limit the ingredient feed when the ingredient is used up. This wheel normally rotates in a clockwise direction; and when the platform 170 is at the top of its stroke, a limit trigger 197 will drop into a notch in the wheel or disks 196, preventing further motion in a manner to be later described. A hand release clutch H on the other end of shaft 188 permits manual relocation of the platform 170 to its bottom position. Moving clutch H outwardly disengages shaft 188 from the step-by-step advance mechanism 186. The trigger 197 is mounted on a pivoted arm 198 on which there is a striker end 199.

On the inner side of the sandwich ingredient platforms 170 vertical plates P span the brackets 194, and these plates widen (Figure 9) at the top to form a support for a portion of the ingredient package. In Figure 10 the ingredient is shown with a wrapping W extending on two vertical sides and across the bottom. Each side terminates in a slight wrap over section 199A, which is thickened at the edge 199B. Horizontal spaced split bars 199C project over table 170 from the top of plate P to engage these wrapper edges, thus permitting the sides of the wrapper to drape away as the ingredient is used. The inside of the bars 199C at 199D overlie the edges of the ingredient inwardly and tend to buckle it upwardly as it moves up by the action of table 170. This facilitates the insertion of the spatula and the separation of slices.

A selector mechanism is necessary to locate the table for any particular ingredient which is intended to arrive at the sandwich-making station adjacent the bread. This mechanism is shown Figures 4 and 11. A plurality of selector buttons is provided at 46 in Figure 4, and these buttons are mounted on levers 200, pivoted at 202, positioned to actuate vertical selector fingers 204, one finger being positioned beneath each lever 200. These selector fingers are mounted on a horizontal rod 206 for pivotal and vertical sliding motion, there being a slot 208 in the fingers. A spring 210 urges the fingers upwardly. A spring latch 212 catches the fingers in their down position as shown in Figure 11 in conjunction with a notch 214 on the fingers.

The lower end of the finger 204 is cut away at 216 to contact an adjustable pin 218 on a curved arm 220 pivoted at 222 adjacent the housing 160. On a lower vertical end 224 of this arm 220 is mounted a control switch 226 normally in open position. When the striker end 199 on arm 198, which moved with the ingredient table, strikes the lower end of finger 204, it kicks the switch 226 outwardly and allows it to close. This switch is electrically associated with a solenoid winding 230, causing the solenoid plunger 232 to rise, thus lifting link 148 and a lever arm 234 which pivots shaft 146 and raises yoke 144 and clutch ring 134 and thus removes power from the table drive and transfers the motion of shaft 130 now to bevel gear 140. The gearing is set up to rotate at about 7 or 8 R. P. M. so that it will stop as soon as power is removed. If desired, a brake may be installed operated by the solenoid.

Engaged with bevel gear 140 is a bevel gear 250 mounted on a cross shaft 252 journaled in housing 150. Cross shaft 252 extends to the left through housing 150 and has mounted thereon an end cap 254 on which projects axially an off-center stud 256 normally in contact with a leaf spring member 260 fastened on switch housing 226. When the switch housing is moved away from the end cap 254 by the action of striker 199 on finger 204, the switch is moved out so that leaf spring 260 may spring away from the housing and allow the switch to close, thus actuating the solenoid 230.

As the end cap 254 moves around due to the movement of shaft 252, the stud 256 will move away from contact with spring 260, thus allowing the cycle to run its course.

When stud 256 rotates 360° it again contacts spring 260 to open the switch, thus de-energizing the solenoid at the end of a cycle, which will be later described, and causing rotation of the table by reason of a shifting of clutch ring 134. Striker arm 199 in contacting the finger 204 shifts it outwardly and releases it from trigger 212, thus allowing the finger 204 to move back to its initial position under the action of spring 210. This causes the button 46 to move back to its original position.

The striker arm 198 is one of five different arms 198A to 198E associated with the five different ingredient containers, each of these arms differing in length in order to make contact with a corresponding finger 204. Each will operate in the manner described above in connection with any particular ingredient selected. As previously described, if any one ingredient is exhausted the striker arm will be rendered ineffective by the notch in disc 196.

The sandwich-making operation is accomplished by mechanism now to be described. Previous reference has been made to slide tube 164 mounted on housing 160. On this slide tube a vertical plate 270 is mounted and at the bottom of this plate 270 a spatula 275 is positioned for horizontal motion across an ingredient container (see Figure 2). Also mounted for forward motion with the spatula and the plate 270 are fingers 276, one of which is shown in plan in Figure 4. These fingers 276 are shown in Figure 7 camming the pins 82 away to move the holders 78 and relieve the lower bread column momentarily as the sandwich is made.

Between the ingredient platform 170 and the sandwich station as viewed in Figure 2 there is mounted a wedge-shaped cross piece 280 intended to elevate the ingredient from the spatula blade to a position overlying the bread (see Figure 13). Resting at the back of the spatula is a hinged prod or nudge plate 282 which rises on the separator unit 280 to push the ingredient onto the bread as the slide completes its stroke. As the ingredient leaves the spatula, the latter knives between the bottom slice of the sandwich and the lower bread column, holding the column down until the retainers 78 return.

Figures 12, 13 and 14 illustrate the manner in which the ingredient is sliced from the top of its container, moved onto the bread, and the sandwich formed. Figure 15 shows the retraction stroke. The top slice of the sandwich is brought down onto the sandwich by reason of the motion of the ingredient over the bottom slice, pushing the downward edge of the top slice outwardly enough that it will drop down of its own weight.

The mechanism for actuating the slide 270 mounted on tube 164 is shown primarily in Figures 2 and 11. On shaft 252 an eccentric cam 290 is located on which is mounted a cam follower 292 pivotally attached to cam 182, which in turn is pivoted at 294. Upwardly from cam 182 extends parallel actuator arms 296 slotted at the top at 297 and connected to cross slide 164 by rearwardly extending members 297 on pins 298. The throw of the eccentric cam wheel 290 is sufficient to move the cross head 270 forward to its final position and back.

As the sandwich is finished, a cam 300, also on shaft 252, actuates a spring-pressed stud 302, which in turn shifts forward a bell crank lever 304, moving plunger 306 to the left, as viewed in Figure 2, and shifting to the left also a sandwich ejector rod 308 on which is mounted the separator blade 280, moving the sandwich through an opening 310. A fine-toothed band saw 312 operating at high speed cuts the sandwich as it is pulled through the opening 310 onto the chute 36 either manually or by power rolls which may be provided. Band saw 312 is driven by a high-speed motor 314 in housing 32.

As the frame 270 moves forward, it actuates lever 100 to release the top bread slice as previously described. The cycle is completed as the cams return the cross slide 270 and the ejector 308 to the original position, at which time the switch 226 will be de-energized by the stud 256 to cause shifting of clutch 134 as previously described and start again the rotation of the ingredient table preparatory to the selection of the another sandwich.

Briefly, the operation can be reviewed in this manner: The ingredient table is constantly rotating; and upon pressing down of one of the ingredient selector buttons, the particular arm which is associated with the selected ingredient will contact the depressed finger 204 and also actuate and close switch 226. This sets into motion the shaft 252 and the associated eccentric cam 290 and cam 300, causing a spatula to separate and move forward a slice of sandwich filler onto the lower slice of the sandwich and at the same time releasing a top slice to complete the sandwich. At the same time, a sandwich ejector moves forward to eject the sandwich through a cutting saw onto a delivery chute. The cycle is completed when the forward moving parts are retracted to their original position and the clutch is actuated by de-energization of the solenoid to again rotate the ingredient table.

I claim:
1. A machine for the making of sandwiches which comprises a combination of a number of mechanisms grouped around a horizontal sandwich-making station and co-operating in the production of a sandwich formed from bread and an interposed ingredient, said mechanisms comprising first a bread supply composed of storage chambers positioned below and above said station for sliced bread, a release mechanism on each of said chambers for releasing a slice of bread to the sandwich station, an ingredient storage and indexing table comprising a rotatable mounting means having radially disposed elevatable platforms for ingredient storage, each positionable selectively laterally adjacent the sandwich station, an ingredient transfer device comprising a horizontal blade positioned at rest adjacent an indexed ingredient supply away from the sandwich station and translatable through the ingredient to a position underlying the sandwich station and overlying the lower bread supply, separator means interposed between the indexed ingredient supply and the sandwich station to separate the ingredient from the knife and elevate it over the lower slice of the sandwich, and means for empowering and synchronizing the mechanisms wherein the ingredient is first indexed, the lower slice is then released, and the ingredient is then transferred and the upper slice released.

2. A combination as defined in claim 1 in which an ejection mechanism moves the completed sandwich out of the machine upon completion of the making thereof.

3. A combination as defined in claim 1 in which a mechanism is provided to permit manual selection of an ingredient through the indexing table, and means is provided to elevate each ingredient platform from which a sandwich portion is removed.

4. A combination as defined in claim 1 in which a follower bar is pivotally mounted on the transfer blade and arranged to cam over the separator knife and complete the motion of the ingredient onto the lower slice of bread.

5. For use in a sandwich making machine a bread supply device comprising a horizontally translatable rack, a plurality of pairs of bread supply tubes positioned adjacent each other on said rack for containing sliced bread, the members of each pair being positioned below and above a sandwich-making station between open ends of the tubes, a bread elevating mechanism in each lower tube, releasable finger mechanisms for preventing the elevation of said mechanisms except upon release, and a releasable mechanism for the upper tube actuatable to deposit a slice on the top of the ingredient after deposit on the lower slice.

6. A device as defined in claim 5 in which the lower tubes of each pair are vertically disposed and the upper tubes are disposed at an angle wherein the upper slice for the sandwich may pivot into the place around its lower edge.

7. For use in a sandwich-making machine, an ingredient transfer device comprising a horizontal blade having an overall projected area substantially equal to that of the flat sandwich, means for projecting said blade through a quantity of ingredient having also the same dimension as the flat area of the sandwich and for moving the blade over one slice of the sandwich, and means interposed between the ingredient and the sandwich for stripping the ingredient from the blade and moving it onto the sandwich comprising a separator knife positioned to cleave over the top surface of the blade under the ingredient and angled upwardly to a position substantially horizontally level with the lower slice of a sandwich to be made, said blade passing under said slice whereby the ingredient is stripped from the blade and moved onto the bread slice, and means at the back of the blade separable from said blade and movable over said separator knife to project said ingredient off from said knife onto said lower slice.

8. A combination as defined in claim 7 in which said blade and said knife are formed of mutually magnetically attracted materials to cause close contact between said blade and said knife.

9. A sandwich-making machine as defined in claim 1 in which each ingredient storage mechanism comprises a platform for supporting a shaped quantity of sandwich ingredient, means mounting said platform for vertical step-by-step movement from a full position to an empty position adjacent a sandwich station, actuating means shiftable to move said platform vertically in response to removal of increments of ingredient from said platform, locking means to hold said platform in any of its multiple positions, and release means to allow said platform to be shifted from empty to full position.

10. A mechanism as defined in claim 1 in which said elevatable platforms are mounted for selective positioning at a sandwich station, selector means to initiate said positioning, and response means at each platform to complete said positioning, and means to inactivate said response means when said ingredient platform has reached empty position.

11. A mechanism as defined in claim 1 in which spaced, parallel gate bars are mounted to lie adjacent to and in contact with an ingredient supply to serve to exert lateral compression on opposite sides of said ingredient to facilitate incremental removal from the supply.

12. A sandwich-making machine which comprises a combination of mechanisms arranged about a sandwich-making station, one of said mechanisms comprising bread storage and feed chambers positioned above and below said station for retaining a plurality of confined bread slices, an elevating mechanism in the lower of said chambers for elevating a column of bread slices, retaining means at the top of said lower chamber for restraining the vertical movement of said lower bread column, one or more ingredient storage platforms laterally adjacent the sandwich station, and means for indexing said platforms upwardly to replenish a transferred ingredient portion, a mechanism comprising an ingredient transfer knife translatable through the ingredient supply to underlie said sandwich station and a top slice of said lower bread column and to overlie the remainder of the lower bread column to hold it against vertical displacement, means translatable with said knife to release said bread holding means, means to transfer the ingredient from the knife to the bread at the sandwich station during the lateral motion of said knife and simultaneously to release a slice from said top bread storage chamber and a sandwich ejection device to move said sandwich off from said knife prior to the retraction of the knife.

13. A device as defined in claim 12 in which means is provided to slidably mount the means to transfer the ingredient from the knife wherein said last means is selectively translatable to serve as a sandwich ejector.

14. A device as defined in claim 12 in which means is provided to be actuated by motion of said knife to release the top slice of a sandwich to an initial position over the sandwich by motion of said knife, and in which said top slice is moved to final position by transfer of said ingredient to overlie said lower slice.

References Cited in the file of this patent
UNITED STATES PATENTS

| Number | Name | Date |
|---|---|---|
| 1,973,195 | Ankcorn | Sept. 11, 1934 |
| 2,298,278 | Clark | Oct. 13, 1942 |
| 2,347,162 | Watts | Apr. 18, 1944 |
| 2,521,213 | Gentry | Sept. 5, 1950 |
| 2,626,575 | Whitsel | Jan. 27, 1953 |
| 2,642,822 | Gentry | June 23, 1953 |